June 5, 1945.  S. FRANCIS  2,377,773
MILLING CUTTER
Filed May 25, 1943
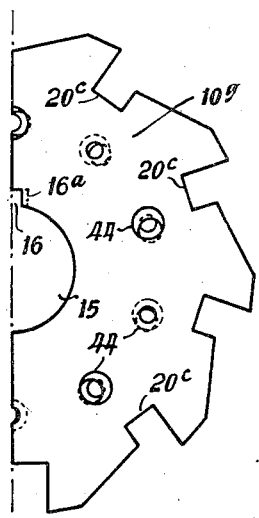
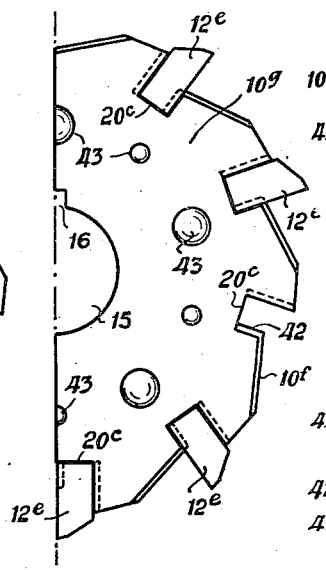
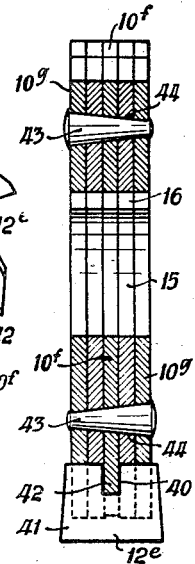
INVENTOR
SYDNEY FRANCIS
BY: Francis E. Boyer
ATTORNEY Patented June 5, 1945

2,377,773

UNITED STATES PATENT OFFICE 2,377,773

MILLING CUTTER

Sydney Francis, Weeton, near Leeds, England

Application May 25, 1943, Serial No. 488,348
In Great Britain June 16, 1942

2 Claims. (Cl. 29—105)

This invention relates to cutting tools for milling and similar operations.

An object of the invention is to provide for the more economic manufacture of such tools.

Another object is to provide that the tools will be more efficient in use.

A further object is to so construct the tool that it will the better withstand vibrations and other shocks to which such tools are subject during use.

In the accompanying drawing:

Fig. 1 is a half elevation of a milling cutter made in accordance with this invention, one of the teeth thereof being omitted.

Fig. 2 is a vertical section, and

Fig. 3 is a half elevation, similar to Fig. 1, but showing the assembly of laminae before insertion of the teeth.

The body member of the cutter comprises a plurality of outer laminae 10g and an inner lamina 10f in the form of metal discs assembled in juxtaposition at their lateral faces. At spaced intervals in the pheriphery of each lamina, teeth receiving recesses 20c are provided. Each lamina 10g and 10f is provided with a spindle receiving bore 15 to which a keyway 16 is provided in the laminae 10g and a similar keyway 16a in the lamina 10f. The keyway 16a, however, is located slightly out of register with the keyways 16 when all the laminae are assembled with their teeth receiving recesses 20c in registry, as seen in Fig. 3. The inner lamina 10f constitutes a locking plate for engaging a groove 40 in the front edge 41 of each tooth 12e. The locking effect upon the teeth 12e is achieved by providing that the said locking plate 10f is to be rotated relative to the other laminae 10g during assembly of the body and teeth. The method of assembly is such that the laminae 10g with the locking plate 10f are juxtaposed with their teeth receiving recesses 20c in registry and the teeth 12e inserted therein. The locking plate 10f is then rotated upon its axis to bring the front walls 42 of its recesses into engagement with the grooves 40 in the front edges 41 of the teeth 12e, whereupon all the laminae 10g and locking plate 10f are secured together by pins 43 or the like and in addition, by welding, brazing or soldering. The teeth are then welded or brazen to the body member.

The rotary movement of the locking plate 10f may very conveniently be effected by providing taper holes 44 in the locking plate and the remaining laminae for receiving the taper securing pins 43 and arranging that the holes in the locking plate are slightly out of register with the holes of the remaining laminae when the teeth receiving recesses in all laminae and the locking plate coincide as is illustrated in Fig. 3. On insertion of the taper securing pins 43, therefore, the locking plate 10f will be caused to rotate as the taper pins enter the holes 44 therein and bring them into register with the holes 44 in the remaining laminae. This movement thereby brings the front walls 42 of the teeth receiving recesses in the locking plate into engagement with the grooves 40 in the teeth 12e, thus locking the teeth in position.

A milling cutter or similar tool made in accordance with this invention will therefore, owing to its comprising a laminated body with teeth welded, soldered, brazed, deposited, or otherwise fixed thereto, absorb vibration and other shocks met with when in use.

What I claim and desire to secure by Letters Patent is:

1. A milling cutter comprising a body member consisting of a plurality of disc-like laminae each provided with circumferentially spaced teeth-receiving recesses and assembled in juxtaposed relation at their lateral faces to present the recesses of adjacent laminae in such adjacency that the walls of said recesses are in alinement throughout the thickness of the body, grooved cutting teeth secured in said recesses and projecting radially beyond the edge of the body member, an intermediate one of said laminae being rotationally displaceable with relation to the remaining laminae thereby to carry one wall of each recess in said intermediate lamina into engagement with the groove in one of said teeth, the constituent elements of said cutter being welded or brazed together to form a unitary structure.

2. A milling cutter comprising a body member consisting of a plurality of disc-like laminae each provided with circumferentially spaced teeth-receiving recesses and assembled in juxtaposed relation at their lateral faces to present the recesses of adjacent laminae in such adjacency that the walls of said recesses extend in continuous alinement throughout the thickness of the body, grooved cutting teeth secured in said recesses and projecting radially beyond the edge of the body member, an intermediate one of said laminae being rotationally displaceable with relation to the remaining laminae thereby to carry one wall of each recess in said intermediate lamina into engagement with the groove in one of said teeth, the teeth being welded or brazed to the laminae, and members passing through the laminae and securing said laminae together.

SYDNEY FRANCIS.